Feb. 18, 1958     O. G. PATCH     2,823,540
APPARATUS AND METHOD FOR METERING ENTRAINED AIR OR GAS
Filed Jan. 19, 1951     2 Sheets-Sheet 1
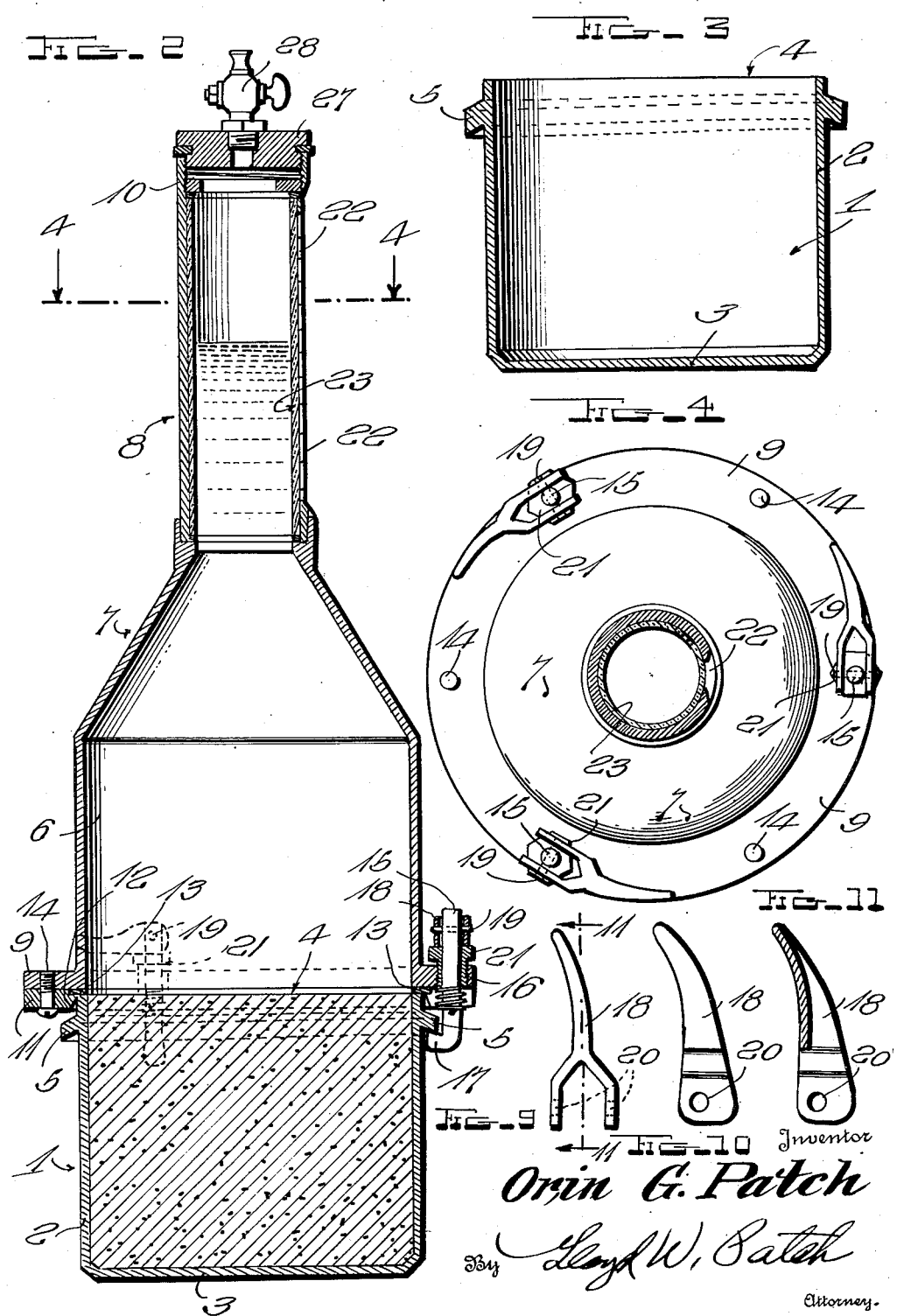

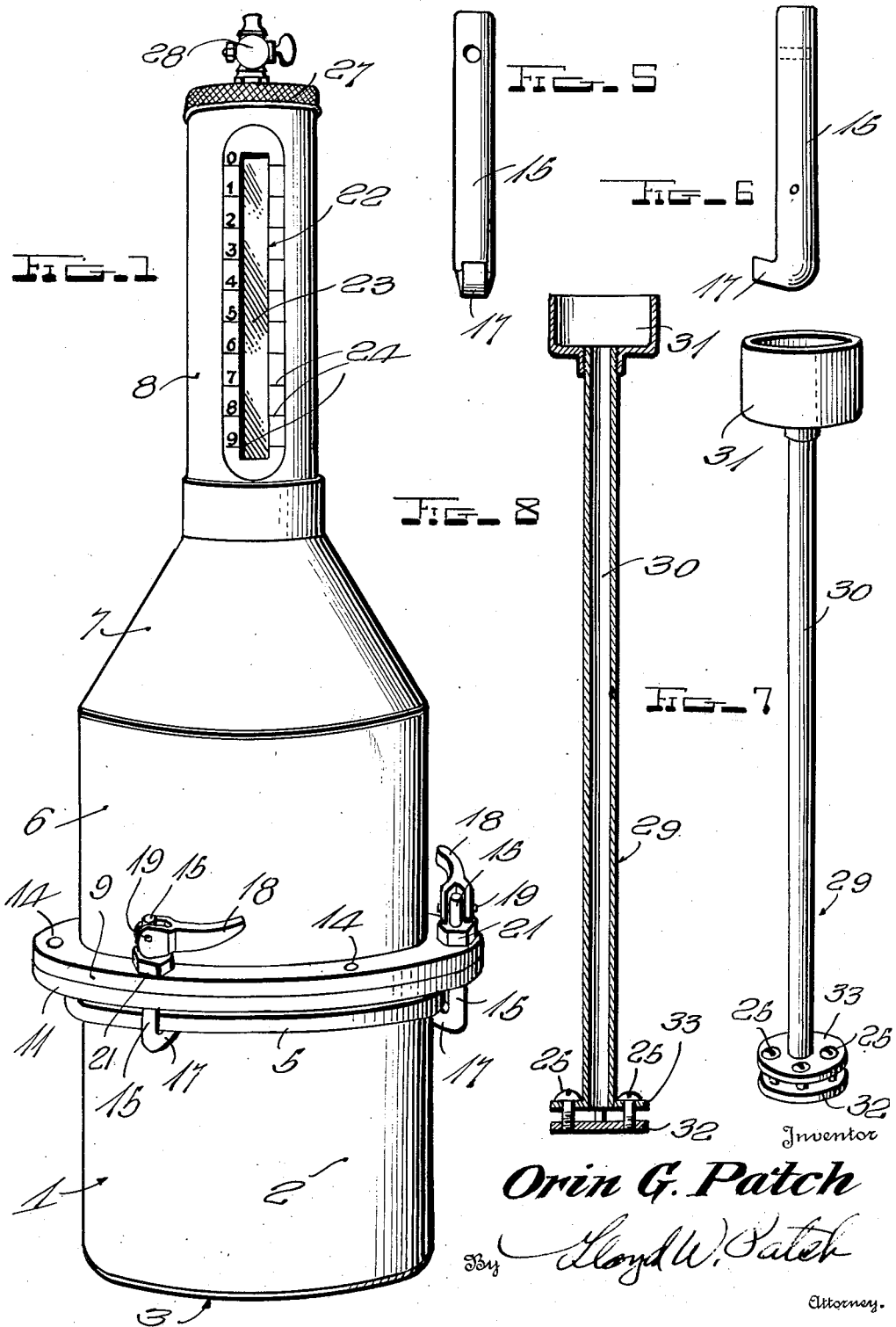

United States Patent Office 2,823,540
Patented Feb. 18, 1958

2,823,540

APPARATUS AND METHOD FOR METERING ENTRAINED AIR OR GAS

Orin G. Patch, Wenatchee, Wash.; Clara L. Patch, executrix of said Orin G. Patch, deceased, assignor, by decree of distribution, to Clara L. Patch Application January 19, 1951, Serial No. 206,761

2 Claims. (Cl. 73—19)

My invention relates to apparatus and method for metering entrained air or gas, and particularly to apparatus and a method for use in metering or measuring to determine the percentage of entrained air or gaseous fluid in fresh concrete and like materials.

An object of my invention is to provide apparatus and a method of determining the percentage of entrained air or gas in which the resultant determination is unaffected by changes in water-cement ratio, sand-cement ratio, sand-to-gravel ratios, inaccuracies of specific gravity determinations, and uncertainties as to absorbed or free water content of the aggregates used in the mix.

Another object is to provide apparatus and a method for automatic entrained air metering which will eliminate all computations and manipulations of a technical nature, making the measurement of entrained air or gas possible by simple and rapid procedures that can be carried out by anyone without the necessity of employing complicated laboratory or other equipment and apparatus, and without necessity of mathematical or other computations and calculations or other special mental processes or special manual manipulations.

Yet another object is to provide apparatus and a method employing a graduated measuring element which will give directly the percentage of air and gaseous fluid in the concrete and like material as entrained air is displaced in the mixture by introduction of water and other liquid fluids.

With the above and other objects in view, some of which will be apparent to those skilled in the art, and others of which are inherent in the carrying out of the steps of my improved method, this invention includes the carrying out of certain novel method and process steps, which will be hereinafter set forth in connection with the drawings, and then pointed out in the claims.

In the drawings:

Figure 1 is a view in perspective of entrained air meter apparatus disclosing an embodiment of my invention.

Fig. 2 is a vertical sectional view taken transversely through the showing in Figure 1.

Fig. 3 is a vertical sectional view through the material sample container.

Fig. 4 is a horizontal sectional view substantially on line 4—4 of Fig. 2, enlarged to better show the air gauge structure.

Fig. 5 is a view in elevation, on an enlarged scale, to better show one of the clamp rod structures.

Fig. 6 is a view in elevation taken substantially at right angles to the showing in Fig. 5.

Fig. 7 is a view in perspective showing a baffle-bottom funnel adaptable for use in supplying water into the apparatus.

Fig. 8 is a longitudinal sectional view through the baffle-bottom funnel.

Figs. 9 and 10 are elevational views to better illustrate the cam clamp lever.

Fig. 11 is a sectional view on line 11—11 of Fig. 9.

A great advancement in concrete construction has been developed in the use of air and gaseous fluid entrainment, which, when correctly controlled, not only increases the resistance of concrete to weathering several fold, but also increases workability, decreases bleeding and segregation, and permits the satisfactory use of wider limits in gradation of aggregates, especially in the sand.

In the use of air entrained concrete, one of the greatest difficulties has been the effective control of the amount of air, which is generally agreed at the present time should be limited to between three to five percent of the volume of the concrete, and it has hitherto been a difficult problem to determine and maintain accurate percentages, due to the tedious technical computations and manipulations ordinarily used for determining accurately the percentage of air or gaseous fluid in a batch of concrete.

Substantially every job where the concrete is to be exposed to weathering will make desirable use of air entraining or gas generating agents or ingredients, and to avoid loss in ultimate strength of the concrete due to too much air or gaseous fluid, which may be serious if over five or six percent, routine tests of entrained air or gas at frequent intervals will be invaluable. Almost no change of mix can be made without resulting change in the percentage of air or gas entrained with the same amount of air entraining agents being used. Frequent and prompt air or gas meter measurements taken whenever a change is made in slump, time of mixing, richness of mix, or nature of sand or proportion of sand to gravel or other ingredients, will usually reveal a resultant and corresponding change in air or gas content which will call for modifying the amount of air or gas entraining agents to be used.

The use of my improved entrained air meter, and the carrying out of my improved process, will permit metering tests to be readily and frequently made with the entrained air or gas percentage or other calculation substantially automatically and visually indicated to be directly read and determined without necessity for computations and manipulations of a technical nature.

In the presently illustrated embodiment, the lower part 1 is made in the form of a material sample containing cup having a cylindrical wall 2 rising from the bottom 3 and with the top open at 4. This cup-like lower part is made to contain a predetermined quantity of fresh concrete or other material. Clamp lug 5 is provided around the outer upper part of the cylindrical wall 2 below the open top 4.

The upper part of the body portion includes an upper cylindrical housing section 6 conveniently made to be of substantially the same size as the lower part, and an inwardly tapered or restricted wall portion 7 is provided at the top of the cylindrical housing section 6, this inwardly tapered portion 7 carrying a reduced tubular air measuring section 8 at its upper end.

An outstanding annular flange 9 is provided around the open lower end of the cylindrical housing section 6, and the tubular air measuring section 8 is internally screw-threaded at its upper open end, as at 10.

An annular packing and centering ring 11 is provided to be fitted on the lower side of the outstanding annular flange 9, and this centering ring 11 has the opening thereof tapered, as at 12, to receive and center the upper edge of the cylindrical wall 2 of the material sample containing cup or lower part 1, around the open top 4. The upper side of the annular packing and centering ring 11 is recessed to receive and hold a packing gasket or washer 13, and clamp screws 14 are provided at suitable intervals to secure the annular packing and centering ring 11 on the lower side of the outstanding annular flange 9, with the packing gasket or washer 13 held therebetween.

Clamp rods 15, the construction of which is perhaps best illustrated in Figs. 5 and 6, have ends adapted to be fitted slidably through openings in the hollow nut 21 provided at annularly spaced locations through the outstanding flange 9 and the annular ring 11. The clamp rods 15 have laterally extending hooked ends 17 adapted to engage against the lower side of clamp lug 5. A clamp cam lever 18 is associated with each of the clamp bolts 15 by a pivot pin 19 extending through the opening 20 in the end, and these clamp cam levers have a cam portion eccentrically at one side of the pivot pins 19. Adjusting nuts 21 are turned into threaded openings 16 of the flange 9, so that the adjusting nuts 21 can be adjusted upwardly and downwardly to provide an adjustable fulcrum against which clamp cam levers 18 will bear.

An elongated viewing opening 22 is milled or otherwise cut or formed through the side wall of the upper reduced tubular air measuring section 8, and a viewing glass tube 23 is mounted to close this opening and to permit viewing of a liquid level within the air measuring section 8. Gauge strips or markings 24 are provided on each side of the elongated viewing opening. Gauge strips 24 are provided with scale markings, or indications graduated in percentage proportions of the volume of the lower section 2.

An externally screw-threaded closing cap 27 is provided to be screwed into the upper screw-threaded end 10 of the air measuring section 8, and an air discharge petcock is preferably provided on said screw-threaded cap 27.

In Fig. 7 of the drawings, I have disclosed a baffle-bottom funnel, generally indicated at 29, conveniently adaptable for filling water or other liquid fluid into the apparatus when the screw-threaded cap 27 is removed. This baffle-bottom funnel has an elongated tube 30 of a length preferably greater than the combined length of the several portions of the upper cylindrical housing section, and of relatively small diameter so that it will fit conveniently through the upper screw-threaded open end 10. At the upper end of the elongated tube 30, the funnel is provided with a flared or enlarged top portion 31 to facilitate pouring liquid into tube 30. A disc-like bottom member 32 of a diameter to fit conveniently through the tubular air measuring section 8 is disposed below the open end of the lower extremity of the elongated tube 30, and a collar 33 on tube 30 has screws 25 supporting the bottom disc 32 in place and in spaced relation.

In the use of my improved apparatus, clamp cam levers 18 are swung upwardly and rotated 180° or so, to release hooked ends 17 from beneath the lugs 5, and the upper section of the housing can then be removed from the lower part 1. Screw-threaded cap 27, with its packing washer, is removed from the screw-threaded upper end 10 of the tubular air measuring section 8. The cup-like lower part 1 is filled with a sample of the concrete to be tested, this sample being tamped or vibrated as any other specimen, and the material is then screeded off to a level full, thus giving a standard volume of concrete or other material for the test. The upper section is then again fitted in place over the open top 4 with gasket 13 resting on the upper edge of the cylindrical wall 2, and clamp rods 15 and clamp cam levers 18 are adjusted to secure the upper and lower sections together with an air and liquid-tight connection, nuts 21 being adjusted to give a proper fulcrum. The baffle-bottom funnel 29 is then fitted through the upper end of the tubular section 8 and is lowered to bring the disc-like bottom 32 substantially to the level of the upper surface of the concrete, and the upper section is then filled with water through this baffle-bottom funnel, which prevents stirring of the concrete. A sufficient quantity of water is filled into the upper section to rise within the measuring tube 8 to be visible through the glass 23, and the baffle-bottom funnel 29 is then removed. Water is added to bring the level of water up to the upper limit of the scale markings, which may conveniently be a zero line. The closing cap 37 is then screwed into place and air discharge petcock 28 is closed. With this assembly of the parts, the upper and lower sections are assembled together and the parts constitute a closed container.

The closed container is then inverted several times, end to end, and is rolled and otherwise agitated until the concrete is thoroughly mixed with the water. This agitation and mixing thins the concrete mixture sufficiently to allow the entrained air or other gaseous fluid to rise to the top and accumulate within the upper tubular air measuring section 8, when the apparatus is again held or supported in upright relation with the bottom 3 lowermost, and due to the fact that the tubular air measuring section 8 is reduced, the volume of air can be readily determined by reading the liquid level against the scale markings at 26.

Scale markings or graduations can be shown directly upon the glass 23 or upon the gauge strips 24, where they can be readily viewed to be read against the water level as visible through the elongated viewing opening 22, and as the graduations are preferably made in one percent increments of the volume of the bottom section, the drop in the water level below the original top zero line is directly the percentage of air or other gaseous fluid which has been entrapped in the sample specimen of concrete and which has been permitted to escape by the replacement with water as the mixture has been thinned during the agitation and mixing.

Reagitation of the apparatus until no further drop in the upper water surface occurs will ensure a correct reading and will prove that all entrapped air or gas has been removed from the mixture by the water or other liquid. Where extra refinement is desirable, a de-foaming agent may be added with the water or other fluid liquid to assist in releasing the air or gas or gaseous fluid.

My improved process or method is accomplished by successively carrying out the several steps as outlined in connection with the use of the apparatus, and this process or method ensures that a direct reading can be accomplished without requirement or necessity for computations and manipulations of a technical nature, thus making the measurement of entrained air or gaseous fluid simple and rapid, and adapting the method or process for employment and carrying out by persons without special skill or knowledge, and making it possible for persons in the field or on the job, in the laboratory, or in any other place, to obtain quickly and accurately desired percentage indications of entrapped air or gas.

While I have herein shown and described only certain specific embodiments in the mechanical construction, and have set forth only certain possible process or method steps and procedures, it will be appreciated that many changes and variations can be made in the apparatus and in the carrying out of the process, without departing from the spirit and scope of my invention. In the foregoing description, I have mentioned concrete mixtures as examples of materials that can be tested, and where I have mentioned water, this will of course be understood as being an example of a liquid fluid, and it will also be appreciated that air, where specified, will include various gases generated by chemical action or otherwise resulting, and in fact any and all gaseous fluids.

I claim:

1. A method of determining the quantity of an entrained gaseous fluid in a material such as fresh concrete comprising in combination the steps of establishing a sample body of a predetermined quantity of the material in the bottom of a container, establishing a body of liquid in the container above and in contact with the sample without agitating the sample, establishing an elongated, vertically disposed column of liquid in said container above and in communication with said body of liquid and having a uniform cross-sectional area throughout its length very substantially less than the cross-sectional area of said sample body, closing said container, and agitating to mix the sample and the liquid thereby releasing entrained gaseous fluid by displacement with liquid, the change in length of said column of liquid indicating said quantity of entrained gaseous fluid.

2. An entrained air meter comprising an open top cup-like container to hold a known quantity of a test sample of material, an upper cylindrical housing section detachably connected in edgewise abutting relationship at the open top of said container and having an upper tubular measuring section provided with a viewing opening therethrough with a transparent closure, said measuring section being open at its upper end to permit supply of liquid into said chamber to a level visible through said viewing opening, a cap closing the liquid supply opening of the measuring section whereby the container is closed to allow shaking and agitation and mixture of the contents to dilute the sample sufficiently with liquid to release entrapped gaseous fluid to rise within the viewing portion with proportionate dropping in the liquid level, and scale markings adjacent to said viewing opening.

References Cited in the file of this patent

UNITED STATES PATENTS

| | | |
|---|---|---|
| 966,078 | Bowman | Aug. 2, 1910 |
| 1,377,577 | Hanson | May 10, 1921 |
| 2,056,196 | Knappen | Oct. 6, 1936 |
| 2,113,686 | Gift | Apr. 12, 1938 |
| 2,280,617 | Bell | Apr. 21, 1942 |
| 2,327,642 | Horner | Aug. 24, 1943 |
| 2,465,948 | Welge | Mar. 29, 1949 |

OTHER REFERENCES

Publication: Journal of the American Concrete Institute, issue of May 1947, vol 18, No. 9, article by Menzel, pp. 1053–1072.

Article by Zimmerman in publication, Engineering News-Record, published Aug. 6, 1936, pages 186–187.